United States Patent [19]

True et al.

[11] 4,305,099

[45] Dec. 8, 1981

[54] LIGHT COLLECTION SYSTEM

[75] Inventors: Thomas T. True, Camillus; William E. Good, Liverpool, both of N.Y.

[73] Assignee: General Electric Company, Portsmouth, Va.

[21] Appl. No.: 117,696

[22] Filed: Feb. 1, 1980

[51] Int. Cl.³ .............................................. H04N 5/74
[52] U.S. Cl. .................................... 358/231; 358/60; 362/296; 362/302
[58] Field of Search ...................... 358/62, 60, 61, 63, 358/231, 232, 233; 362/296, 297, 298, 302, 304

[56] References Cited

U.S. PATENT DOCUMENTS

| | | | |
|---|---|---|---|
| 2,131,852 | 10/1938 | Brackett | 362/396 |
| 3,078,760 | 2/1963 | Brownscombe | |
| 3,290,436 | 12/1966 | Good | |
| 3,325,592 | 6/1967 | Good et al. | |
| 3,330,908 | 7/1967 | Good et al. | 358/233 |
| 4,151,584 | 4/1979 | Labrum | 362/302 |

OTHER PUBLICATIONS

"Optimizing the Compound-Reflector Framing Spotlight", Labrum *SMPTE Journal*, vol. 87, Oct. 1978, pp. 694-699.

*Primary Examiner*—Richard Murray

[57] ABSTRACT

A light collection system for projectors, such as light valve projectors, has a compound reflector associated with an arc lamp. The compound reflector includes an ellipsoidal reflector positioned to collect a portion of the light from the arc lamp and reflect a direct image of the light in a beam to an image forming plane of the projector and a spherical reflector positioned to collect another portion of the light from the arc lamp and reflect it back through the gap of the arc lamp to the ellipsoidal reflector to be reflected as a secondary image of the light from the lamp in the beam. The ellipsoidal and spherical reflectors are formed as full, uninterrupted surfaces of revolution. To provide uniform light distribution, the beam is directed through a pair of spaced lens plates, each having corresponding arrays, in rows and columns, of rectangular lenticules. The adjacent focus of the ellipsoidal reflector is centered in the arc, while the center of curvature of the spherical reflector, in order to avoid transmission loss through the arc, is displaced to a portion of the gap of the lamp which is relatively free of the arc. For maximum light efficiency, the direct image is focused just to one side, and the secondary image is focused just to the other side of the image forming plane.

5 Claims, 15 Drawing Figures

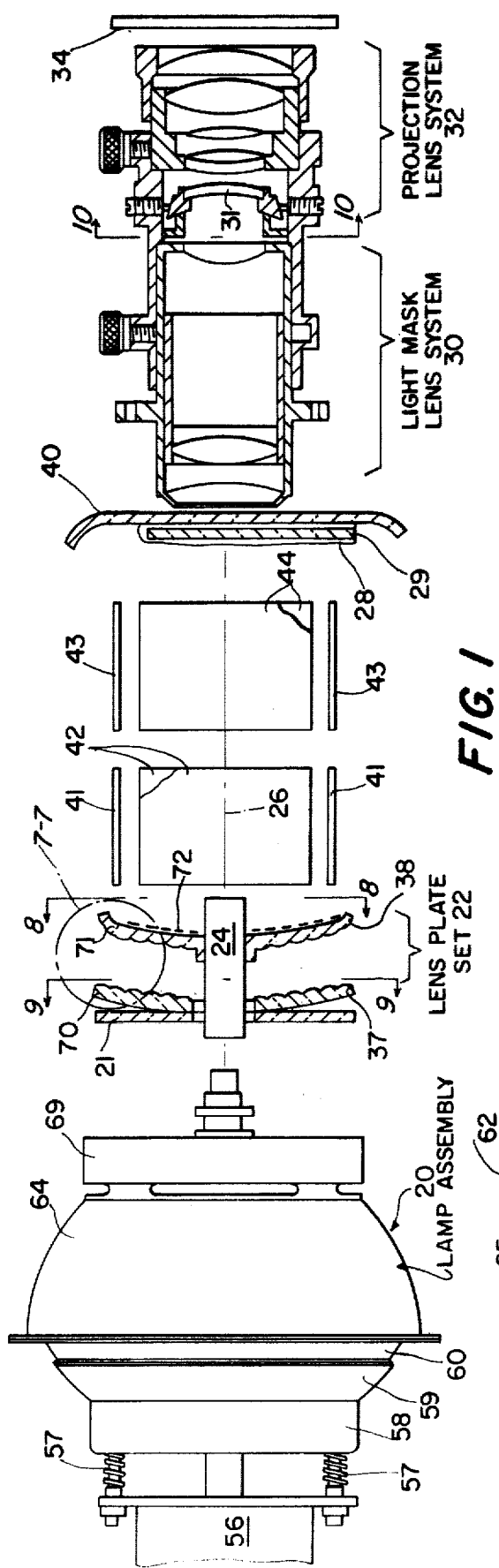

LIGHT COLLECTION SYSTEM

BACKGROUND OF THE INVENTION

1. Field of the Invention

This invention relates to improvements in light collection systems providing light beams for projectors, such as light valve projectors.

2. Description of the Prior Art

Typical prior art color projection systems of the light valve type, as shown in U.S. Pat. No. 3,290,436, W. E. Good et al., and U.S. Pat. No. 3,325,592, W. E. Good et al., both assigned to the assignee of the present invention, include a light collection system having an arc lamp located at the adjacent focus of a simple ellipsoidal reflector. A light beam is reflected from the ellipsoidal reflector through a pair of spaced lens plates having corresponding pluralities of rectangular lenticules stacked into horizontal rows and vertical columns. The second lens plate carries the input light mask of a schlieren optical system, which also includes a light modulating medium and a light output mask, for directing an image onto a viewing screen. With this arrangement, efficient utilization is made of light from the arc lamp, and uniform distribution of light is produced on the light modulating medium.

Present color light valve projectors of this type produce about 250 to 300 screen lumens white light output. There is, however, a need for higher lumen output for many applications. While the use of a more powerful lamp will obviously provide greater light output, lamps rated at 1,000 watts have been found to be a practical limit. Lamps with higher ratings draw too much current for a convenient 20 amp. circuit. The reflector is desirably a "cold" mirror to minimize infrared reflection. If the power of the lamp is too high, the reflector will become overheated and the reflecting surface may be damaged. Lamps of higher rating require larger envelopes which begin to interfere with the light collection efficiency of the reflector unless a reflector of greater size is employed. Also, as the rating of the lamp is increased, the size of the arc and its image increase. If the image becomes too large, it will no longer fit through the slots of the schlieren system and some of the light will be wasted by illuminating the bars between the slots. It is therefore necessary to devise a system which more efficiently utilizes the light output of the lamp.

To this end, attempts to improve light collection from simple, single reflector collection systems have not been fruitful. An increase in the collected flux is possible when the collection angles are symmetrical about the 90° point of the arc lamp emission; a maximum collection angle of about ±31° about the 90° point may be attained. Although this is slightly better than the present single reflector design, it is not a meaningful improvement because the flux density variation is worse in that a hot spot is created at the center of the image.

The use of compound reflectors has also been suggested in the past for improving light collection efficiency in apparatus for projecting pictures from transparencies. In U.S. Pat. No 3,078,760, P. J. Brownscombe, improved light collection efficiency is achieved with the use of a reflecting hemisphere concentric with the axis of the arc lamp for collecting the lower half of the lamp emitting radiation and reflecting it back through the arc of the lamp to a main ellipsoidal reflector and auxilliary ellipsoidal reflectors. In order to maintain uniform light distribution in the rectangular light field needed in the projector, Brownscombe found it necessary to truncate opposite sides of the main ellipsoidal reflector, place the auxilliary ellipsoidal reflectors in the truncated areas outside the main reflector, and provide additional semi-elliptical flat mirrors in a chevron-like array below the lamp to receive the image reflected from the auxilliary reflectors. Needless to say, this arrangement is unduly complex.

SUMMARY OF THE INVENTION

It is therefore the principal object of this invention to provide improved light collection systems for projectors.

In particlar, it is an object of the invention to provide a light collection system using a compound reflector formed of full, uninterrupted surfaces of revolution in combination with spaced lens plates, each having a plurality of lenticules, to provide increased light collection efficiency while maintaining uniform light flux density.

To these ends, the invention contemplates the provision of a light collection system including an arc lamp having a pair of electrodes forming a gap and means for establishing an arc within the gap. A compound reflector for the lamp includes an ellipsoidal reflector positioned to collect a portion of the light from the arc and reflect the light from the arc as a direct image in a beam between an inner cone and an outer cone to an image forming plane of the projector and a spherical reflector positioned to collect another portion of the light from the arc and reflect the light from the arc back through the gap to the ellipsoidal reflector to be reflected as a secondary image of the light from the arc within the beam. Both the ellipsoidal and spherical reflecting surfaces are formed as full, uninterrupted surfaces of revolution. In order to provide uniformity of light density in the beam as it strikes the image forming plane of the projector, a pair of spaced lens plates are placed in the beam. Each lens plate comprises a plurality of rectangular lenticules arranged in horizontal rows and vertical columns. The first lens plate effectively converts the direct and secondary images of the arc source as reflected by the reflecting surfaces into a plurality of such images; and each of the lenticules of the second plate images a corresponding lenticule of the first plate onto the image forming plane. By superimposing the images from the lenticules on the image forming plane, uniform light density is achieved.

The adjacent focus of the ellipsoidal reflector is ideally positioned in the plasma or hottest part of the arc. The inventors have observed, however, that when light reflected from the spherical reflecting surface is directed through the plasma there is an 80% transmission loss. It is accordingly an important aspect of the invention to displace the center of the spherical reflecting surface from the adjacent focus of the ellipsoidal surface to a region of the electrode gap which is relatively free of the arc, i.e. a region of relative low arc intensity. In this way, transmission through the plasma is avoided when light from the spherical surface is reflected back through the gap. This avoids the loss associated with transmission through the plasma and increases the efficiency of the light collection system.

This displacement of the center of curvature of the spherical reflector is provided by the mounting structure for the spherical reflector. The ellipsoidal reflector has a peripheral flange, the plane of the front face of which lies in the plane of the latus rectum of the ellipsoid extending through the arc. The flange includes a stepped shoulder, the plane face of which is spaced from and parallel with the front face of the flange. The spherical reflector has a peripheral mounting flange, the flat face of which lies in a plane extending through the center of curvature of the spherical reflector. In mounting the spherical reflector on the ellipsoidal reflector, the face of the mounting flange of the spherical reflector is placed in abutting relation with the face of the spaced shoulder of the ellipsoidal reflector, thus placing the center of curvature of the spherical reflector a distance established by the position of the stepped shoulder from the latus rectum of the ellipsoidal reflector.

For maximum light efficiency when the anode of the arc lamp is to the rear, the direct image should be focused shorter than the image forming plane, while the secondary image should be focused longer than the image forming plane. When the cathode is to the rear, this relationship is reversed.

In a preferred embodiment of the invention, the ellipsoidal reflector is positioned behind the arc, and the spherical reflector is positioned forward of the arc and outside the outer acceptance limit of the beam. A second embodiment positions the forward spherical reflector within the inner acceptance limit of the beam. In a third embodiment, the ellipsoidal reflector is positioned forward of the arc, and the spherical reflector is behind the arc.

The novel features believed characteristic of the present invention are set forth in the appended claims. The invention itself, together with further objects, principles and advantages thereof, may be best understood by reference to the following detailed description taken in conjunction with the accompanying drawings.

BRIEF DESCRIPTION OF THE DRAWINGS

FIG. 1 is a schematic diagram of the optical elements of a system useful in explaining the present invention.

FIG. 2 is a section view of a preferred embodiment of the invention.

DESCRIPTION OF THE PREFERRED EMBODIMENTS

Figure 3:
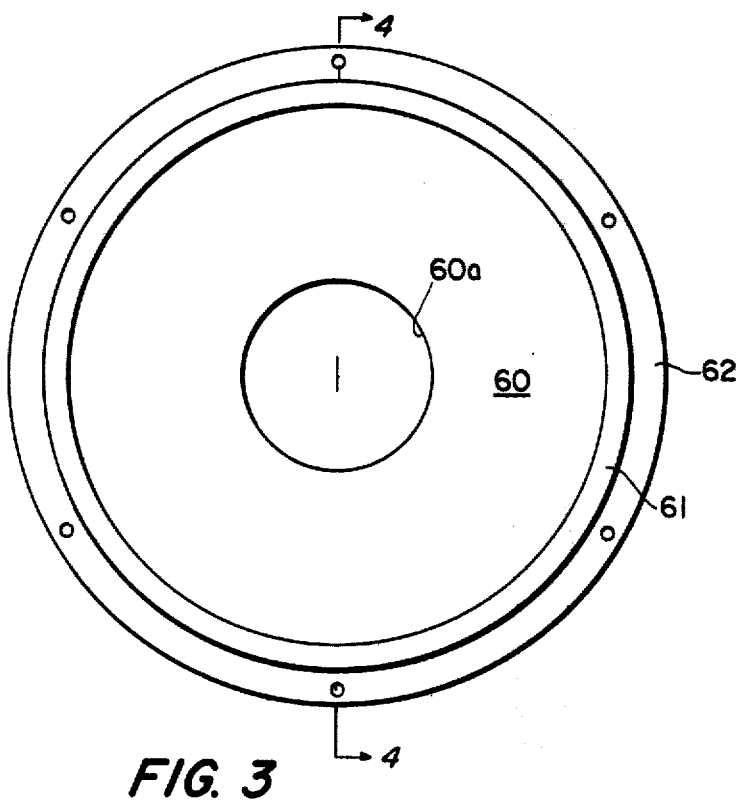
FIG. 3 is an elevation view of an ellipsoidal reflector of the embodiment of FIG. 2.

In light valve projection systems having the electron gun on axis, light is only accepted within discrete inner and outer cones which define the inner and outer acceptance limits of the light beam. Because of the finite outer diameter of the input window and the finite f/number of the output optics, any light rays which are outside of a ±9.6° angle will be blocked and cannot pass through the light valve (corresponding approximately to a f/3 optical projection system). Also, the light must enter the light valve outside of the electron gun, because any light which is closer to the optical axis than a ±3° angle will be blocked by the gun and cannot enter the light valve.

Accordingly, any light collection system used with an electron gun-on-axis light valve projection system should maximize the light flux which can be directed towards the center of the raster and contained between inner and outer cones of ±3° and ±9.6°, respectively. The light collection system should also minimize the variation of light flux density from the inner to the outer zones of the input window. In addition, it is necessary to minimize the exterior extremes of the light collection system to fit within a projector package of reasonable size.

As will be explained in greater detail hereinbelow, these criteria are maintained by the light collection systems of the invention while substantially increasing the collected light flux as compared with the maximum light flux available with a single reflector. This is achieved by using a second spherical reflector which collects light not collected by the ellipsoidal reflector and which reimages this light back through the gap of the arc lamp. The reimaged light is directed between the acceptance angles of the ellipsoidal reflector and is thus directed into the input zones of the light valve. Also, by offsetting the center of the spherical reflector from the adjacent focus of the ellipsoidal reflector to a portion of the gap which is relatively free of the arc, transmission loss through the hottest and least transparent portion of the arc is avoided; and the light collection efficiency is further enhanced.

Turning now to FIG. 1, a lamp assembly 20 according to the present invention is shown incorporated in an electron gun-on-axis light valve projection system. The system includes a filter plate 21 and a set of lens plates 22 mounted around an electron gun 24. The gun emits an electron beam 26 which impinges against a light modulating medium 28 forming part of the light valve. Medium 28 is, as is known in the art, an oil of appropriate viscosity and deformation decay characteristic on a transparent support member 29 coated with a transparent conductor, such as indium oxide. The system also includes a light mask lens system 30 for an output light mask 31 (to be described more fully hereinbelow) and a projection lens system 32 for projecting an image upon a projection screen 34.

Figure 7:
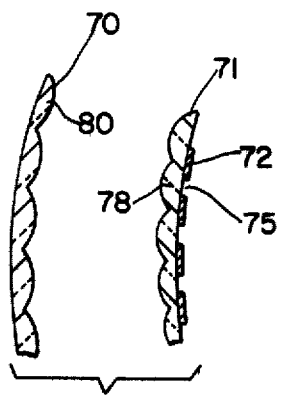
FIG. 7 is an enlarged partial view of the portion 7—7 of FIG. 1.
Figure 8:
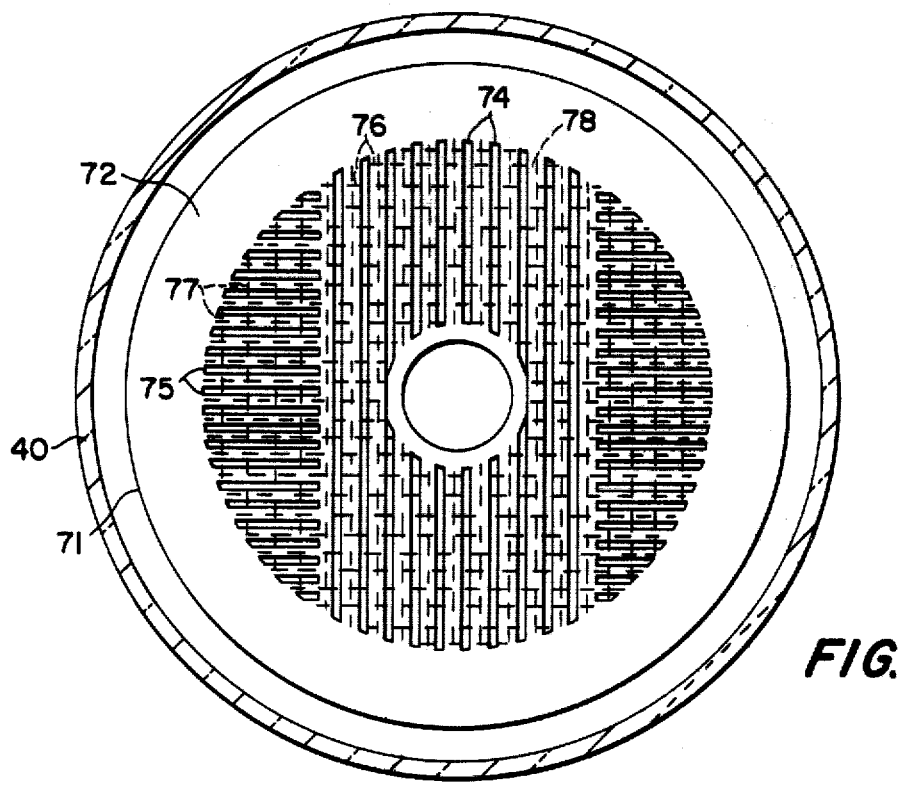
FIG. 8 is an end view taken along section 8—8 of the system of FIG. 1 showing the second lenticular lens plate and the input mask thereof.
Figure 9:
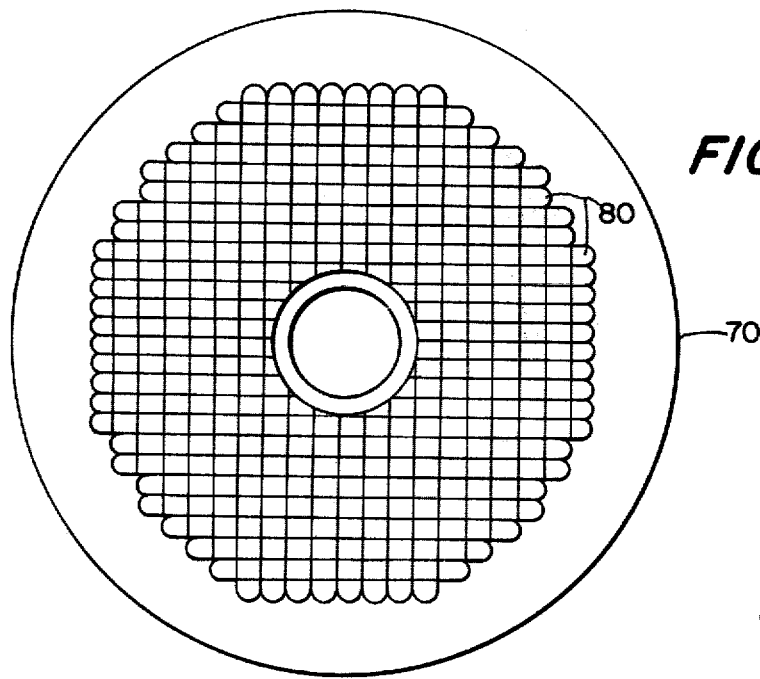
FIG. 9 is an end view taken along section 9—9 of the system of FIG. 1 showing the first lenticular lens plate thereof.

For purposes of illustration, the system of FIG. 1 is a color projection system. For this reason, filter member 21, which is generally circular, has a vertically oriented central portion adapted to pass substantially only the red and blue, or magenta, component of white light and has segments on each side of the central portion adapted to pass only the green component of white light. Lens plate set 22 includes a first lens plate member 70 of generally circular outline which consists of a plurality of lenticules 80 (FIG. 9) of rectangular configuration stacked in horizontal and vertical array. Lens plate set 22 also includes a second lens plate member 71, spaced from lens plate member 70, of generally circular outline also having a plurality of lenticules 78 (FIG. 8) of rectangular configuration on one face thereof stacked in horizontal and vertical array. The input mask 72 of the light valve system is located on the opposite face of lens plate 71 and, as best shown in FIG. 8, includes vertically oriented slots 74 utilized in controlling the red and blue light color components to be projected. The horizontally extending slots 75 located in the sector areas in the input mask on each side of the central portion thereof function to cooperate with the light modulating medium to control the green color component of the image to be projected. The rectangular areas enclosed by vertical and horizontal dash lines 76 and 77, as seen in FIG. 8, are the boundaries for the individual lenticules 78 appearing on the opposite face of lens plate member 71. The relationship between the lenticules 80 of lens plate member 70 and the lenticules 78 of lens plate member 71 is best seen in the detailed view of FIG. 7, the lenticules each having a height to width ratio of three to four. This is the same aspect ratio as the raster area of modulating medium 28.

Electron beam 26 sweeps this raster area of light modulating medium 28 under the control of pairs of vertical deflecting plates 41 and 43 and pairs of horizontal deflecting plates 42 and 44. Because the electron beam must operate in a vacuum, a transparent envelope 40 is provided to enclose electron gun 24, deflection system 41, 42, 43 and 44 and modulating medium 28 and its support plate 29, as well as filter 21 and lens plate set 22 which are mounted about electron gun 24.

Figure 10:
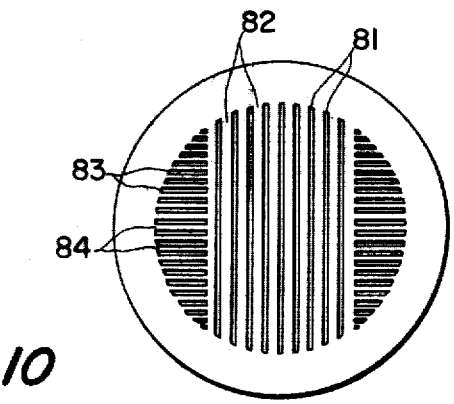
FIG. 10 is an end view taken along section 10—10 of the system of FIG. 1 showing the light output mask thereof.

Referring to FIG. 10, it is seen that light output mask 31 includes a plurality of transparent slots 81 and opaque bars 82 in a central vertically extending section of the mask and a plurality of transparent slots 83 and opaque bars 84 in each of two sectors of the mask lying on each side of the central portion thereof. The slots and bars of light output mask 31 are in a predetermined relationship to the slots and bars of light input mask 72.

Although the light valve projection system per se is known in the art and is not a contribution of the present invention, it is to be noted, in general, that the light input and output masks and the light modulating medium cooperate to form the color image projected on screen 34. In the absence of deformations in light modulating medium 28, light mask lens system 30 images light from each of the slots of input mask 72 upon corresponding opaque bars of output mask 31. When the light modulating medium 28 is deformed, light is deflected or deviated by medium 28, passes through the slots of output mask 31, and is projected upon screen 34. For further details of the structure and operation of the prior art light valve projection system, and the electric control circuitry therefor, the aforementioned U.S. Pat. No. 3,290,436 and U.S. Pat. No. 3,325,592, and the prior disclosures referenced therein, should be consulted; the disclosures of these patents are incorporated by reference herein.

Lamp assembly 20, which supplies light for the light valve projection system shown in FIG. 1, is shown in greater detail in FIG. 2. Assembly 20 includes an arc lamp 50 having within its sealed envelope an anode 51 and a cathode 52 forming a gap 53 within which a high light intensity arc will form. Lamp 50 may typically be a high pressure xenon lamp with a 1,000 watt rating as provided by Conrad Hanovia or Optical Radiation Corp. It will be noted that the lamp is coaxial with the light valve projection system of FIG. 1 and is supported between a pair of end ferrules 54 and 55. End ferrule 54 is supported by a mounting structure 56 which has a flange 56a for receiving a plurality of mounting studs 57 supporting the compound reflector of the assembly. The ends of studs 57 are received in holes provided in a reflector mounting member 58 which includes a generally conical surface 59. This conical surface conforms approximately to a portion of the rear side of an ellipsoidal reflector 60 to which it is cemented by means of a suitable adhesive.

Figure 4:
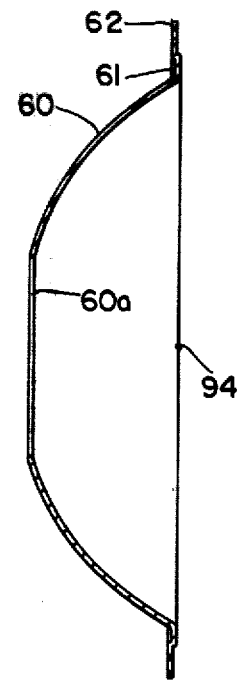
FIG. 4 is a section view along line 4—4 of FIG. 3.

With reference to FIGS. 3 and 4, it will be seen that ellipsoidal reflector 60 is formed as a full, uninterrupted surface of revolution and has a central opening 60a to slip over lamp 50. Reflector 60 includes a peripheral flange 61, the flat front surface of which coincides with the latus rectum of the ellipsoidal reflecting surface. The adjacent focus 94 of the ellipsoidal surface thus is positioned in the plane of the front surface of flange 61 and is positioned on the axis of the system as illustrated in FIG. 4. Flange 61 has a stepped perpheral shoulder 62, the flat front surface of which is spaced a small distance, such as 17 mils, from the flat front surface of flange 61, thus positioning the surface of shoulder 62 this distance from the latus rectum.

Figure 5:
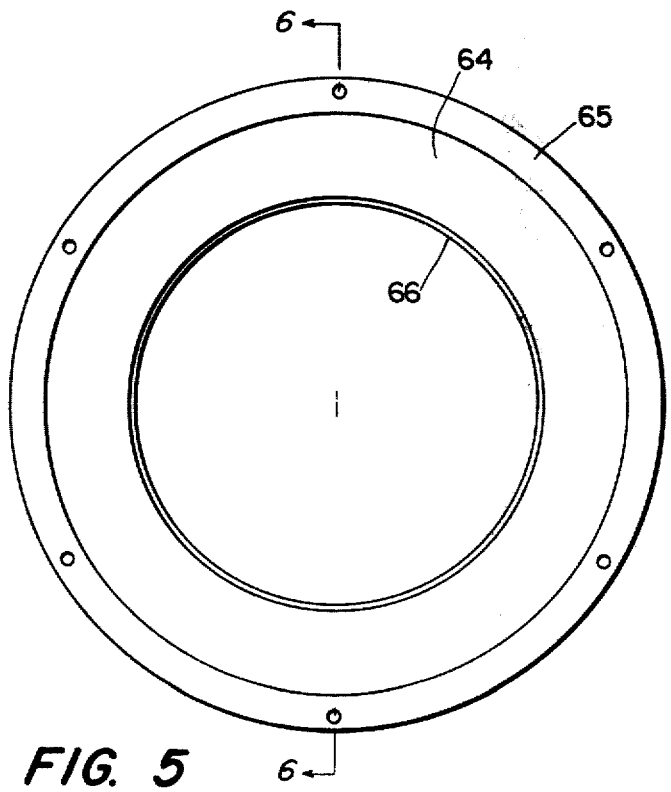
FIG. 5 is an elevation view of a spherical reflector of the embodiment of FIG. 2.
Figure 6:
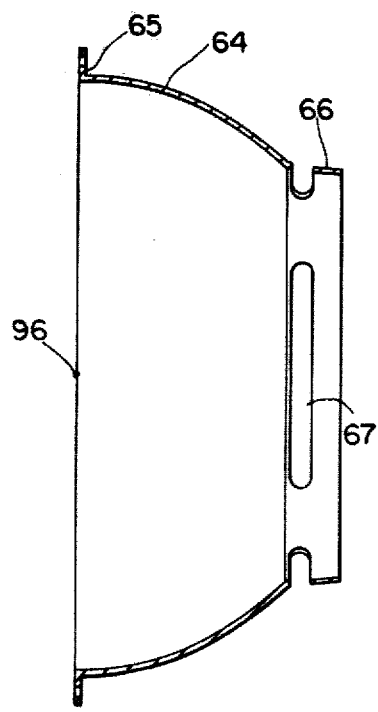
FIG. 6 is a section view along lines 6—6 of FIG. 5.

The compound reflector also includes a spherical reflector 64. As seen in FIGS. 2, 5 and 6, reflector 64 is formed as a full, uninterrupeted surface of revolution and includes a spherical reflecting surface forward of the arc gap 53 and positioned to collect light not collected by ellipsoidal reflector 60 and reflect this light back through gap 53 to ellipsoidal reflector 60. Reflector 64 includes a peripheral flange 65, the outer flat surface (the surface facing left as seen in FIGS. 2 and 6) of which lies in the same plane as the center of curvature 96 (FIG. 6) of the spherical reflecting surface. Reflector 64 is mounted on reflector 60 by positioning flange 65 of reflector 64 in abutting relationship with peripheral shoulder 62 of reflector 60 with corresponding mounting holes in alignment and bolts 65a extending through the mounting holes to securely fasten flange 65 to shoulder 62. By virtue of this arrangement, the center of curvature 96 of the spherical reflecting surface will be spaced from the focus 94 of the ellipsoidal reflecting surface the same distance (17 mils in the example) that the front surface of shoulder 62 is spaced from the front surface of flange 61.

Reflector 64 also includes a lens mounting ring 66 which has a plurality of slots 67 extending about the periphery of the ring spaced from the distal end thereof. A plano-concave lens 68 has a shoulder 68a on its plane side which is slipped within ring 66, as best seen in FIG. 2. A lens mounting clamp ring 69 slips over the peripheral edge of lens 68 and ring 66 and has tabs extending into slots 67 and onto the concave side of lens 68 to securely mount the lens on ring 66. Lens 68 serves to shorten the optical system and also serves as a natural barrier to the environment. Ellipsoidal reflector 60 is designed to provide a f/1.4 collection angle which is changed to a collection angle of f/3 by lens 68. The lens thus provides the light beam 88 between the acceptance limits of inner cone 90 with an angle of ±3° about the central axis and outer cone 91 with an angle of ±9.6°.

Figure 11:
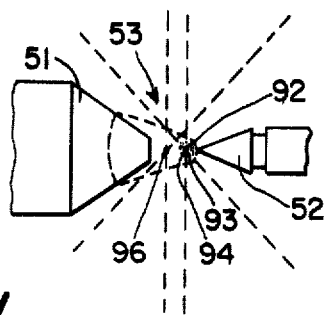
FIG. 11 is a schematic diagram of the gap of the arc lamp, illustrating a principle of the invention.

Referring to FIG. 11, which shows an enlarged schematic view of the gap 53 between anode 51 and cathode 52 of arc lamp 50, it will be seen that the plasma or hottest part 93 of the arc 92 is concentrated adjacent cathode 52; the gap is approximately 4 mm. long, and the hottest part of the arc 93 is located 0.5 mm. to 1 mm. from the cathode end of the gap. Because the lamp is most brilliant at the plasma 93 of arc 92, the adjacent focus 94 of the ellipsoidal reflector is centered here. However, the inventors have observed that the plasma 93 of the arc is not fully transparent. When spherical reflector 64 is positioned to reflect light from arc 92 back through the plasma of the arc, there is an 80 percent transmission loss. This loss is avoided, according to the invention, by positioning spherical reflector 64 with its center of curvature 96 displaced from focus 94 within arc 92 to a position closer to anode 51 which is relatively free of the arc. This is accomplished, as explained above, by providing the offset shoulder 62 for mounting spherical reflector 64. Center of curvature 96 is thus displaced approximately 17 mils from focus 94, which distance is sufficient to avoid plasma 93 of arc 92.

It is important that the ellipsoidal and spherical reflectors be geometrically accurate. Good replication of these curved surfaces is achieved by electroforming the reflectors which are provided with metallic cold mirror coatings. The reflectance is desirably greater than 92 percent for the visible spectrum with the response at 430 and 660 NM greater than 85 percent. The reflectance of the mirror surfaces should be uniform without visible coloration across the collection zones of the reflectors. The mirror coatings should reject infrared with the reflectance between 750–1100 NM being less than 20 percent.

In a typical application, ellipsoidal reflector 60 may have a diameter of 6 inches at the front end of the ellipsoid which coincides with the latus rectum. The ellipsoid may have an eccentricity E=0.7048 with a major axis of 11.920 inches and a distance between foci of 8.4 inches. Spherical reflector 64 has a larger diameter of 6.5 inches so that it can collect at least 45° of the forward flux without interfering with outer acceptance cone 91.

Uniformity of light distribution at the raster plane is attained by directing light beam 88 through lens plates 70 and 71. The first lens plate 70 functions effectively to convert the direct image of arc 92 and the secondary image thereof into pluralities of such images corresponding in number to the number of lenticules 80 on lens plate 70 and to image the direct and secondary images of the arc on individual separate elements of the transparent slots in input mask 72 on lens plate 71. Each of the lenticules 78 on lens plate 71 images a corresponding lenticule on lens plate 70 onto the image forming, or raster plane, of light modulating medium 28. Each of the lenticules 80 of lens plate 70 have the same focal length which is different from the focal length of lenticules 78 on lens plate 71. With the arrangement described, there is efficient utilization of light from the arc lamp; and also uniform distribution of the light is produced on light modulating medium 28 at the image forming or raster plane.

Figure 12:
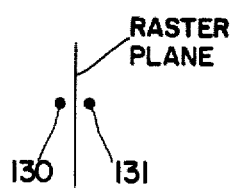
FIG. 12 is a schematic diagram showing the relation of the foci of the primary and secondary images of the arc to the raster plane.

When, as shown, the anode is to the rear of the cathode of lamp 50 with center of curvature 96 located between focus 94 and ellipsoidal reflector 60, the secondary image produced by the spherical reflector 64 is focused longer than the direct image produced by the ellipsoidal reflector. Neither the direct nor the secondary image should be focused at the image or raster plane. For maximum light efficiency, the direct image should be focused slightly shorter, and the secondary image slightly longer, than the raster plane. This is illustrated in FIG. 12 where the focus 130 of the direct image, which is located at the remote focus of the ellipsoid, is shown just to the left of the raster plane. Focus 131 of the secondary image is, on the other hand, just to the right of the raster plane. When a lamp is used with the cathode to the rear, center of curvature 96 will be forward of focus 94. In that case, the secondary image will focus shorter than the direct image. As before, the raster plane will be positioned between these foci.

Figure 13:
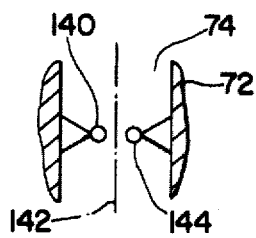
FIG. 13 is a schematic diagram showing the primary and secondary images of the arc at an input slot.

The light efficiency is also enhanced by positioning the direct and secondary images as produced by one lenticule on opposite sides of the center of each slot of the input mask. This positioning of the direct and secondary images symmetrically about the center of each slot of the input mask is achieved by the positioning of the center 96 of spherical reflector 64 in the arc relative to the positioning of adjacent focus 94 of ellipsoidal reflector 60. This is illustrated in FIG. 13 which shows part of one of the vertical slots 74 of input mask 72. The direct, or primary, image 140 of the cathode tip and arc is to the left of center line 142 of the slot, while the secondary image 144 of the cathode tip and arc is to the right of the center line.

In the operation of the embodiment of FIG. 2, ellipsoidal reflector 60 collects a portion of the light from arc 92 and reflects the light as a direct image through lens 68 as a light beam 88 falling between inner cone 90 and outer cone 91. Ellipsoidal reflector 60 thus captures directly light from arc 92 which is directed rearward of the latus rectum of the ellipsoidal surface. Without spherical reflector 64, light directed from the arc forwardly of the latus rectum would be lost. With spherical reflector 64 positioned as shown, however, the light directed forwardly from arc 92 is captured by spherical reflector 64 and is reflected back through gap 53 and, illuminating the reflecting surface of ellipsoidal reflector 60, is included within light beam 88 as a secondary image of light from arc 92. Since the center of curvature 96 of spherical reflector 64 is displaced to a more transparent portion of arc 92, the transmission loss associated with transmission through the arc is thereby minimized.

Measurements of the light collection efficiency of the embodiment of FIGS. 1–6 have indicated an efficiency which is at least 1.5 times better than that attained with the prior art collection system using a single ellipsoidal reflector. While part of this improvement may be attributed to more accurate curve replication of the electroformed reflectors, a substantial part of the improvement is due to the increased collection of the light flux. It is estimated that the light collection efficiency is about 28% greater than the light collection efficiency of a single ellipsoidal reflector.

Figure 14:
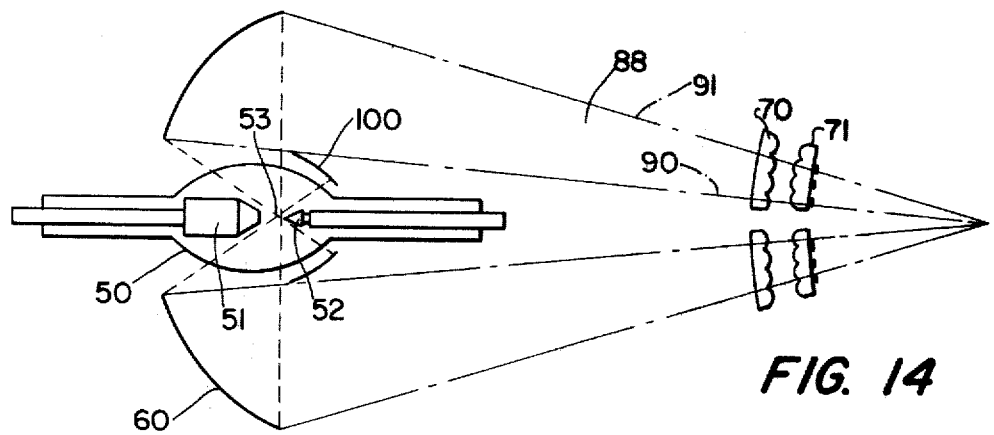
FIG. 14 is a schematic diagram of a second embodiment of the invention.

Another embodiment of the invention is shown schematically in FIG. 14. Arc lamp 50 is again positioned relative to ellipsoidal reflector 60 to place the adjacent focus of the ellipsoidal surface in the gap 53 between anode 51 and cathode 52, coinciding with the location of the plasma of the arc adjacent cathode 52. However, the spherical reflector, which in the embodiment of FIGS. 1–6 is located outside outer cone 91, is now moved inside inner cone 90. Thus, a much smaller spherical reflector 100, which subtends the same arc as reflector 64 in FIG. 2, is located within cone 90 adjacent the envelope of lamp 50. This reflector, which has its center of curvature shifted from the latus rectum of ellipsoidal reflector 60 into the relatively clear portion of arc 92, operates essentially in the same manner as spherical reflector 64 of FIG. 2 and collects light extending forwardly of arc 92, reimaging the light back through the more transparent portion of gap 53 to ellipsoidal reflector 60. Although reflector 100 could be located within the glass envelope of lamp 50 to avoid transmission losses through the envelope, this has not been found in practice to be feasible; the reflector is quickly contaminated by the vapor in the lamp. Lens plates 70 and 71 are again used and, as before, provide uniform light distribution at the raster plane.

Figure 15:
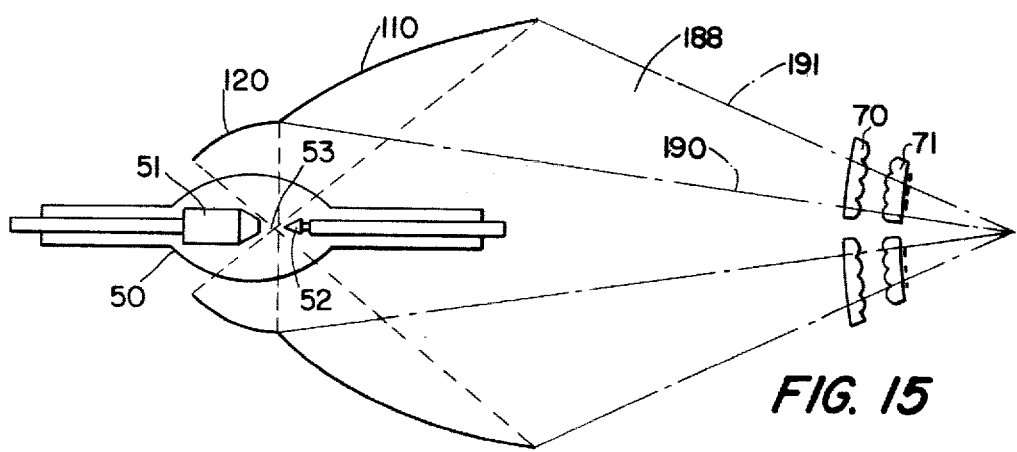
FIG. 15 is a schematic diagram of a third embodiment of the invention.

A third embodiment, shown in FIG. 15, employs an ellipsoidal reflector 110 positioned forwardly of arc gap 53 of arc lamp 50. Again, the latus rectum of ellipsoidal surface 110 extends through gap 53 to place the adjacent focus of the ellipsoid coincident with the arc adjacent cathode 52. Light extending forwardly from the arc is collected by reflector 110 and reflected forwardly as light beam 188 between the inner cone 190 and outer cone 191. Light directed rearwardly from the arc is collected by a spherical reflector 120 positioned behind the arc. The center of the spherical surface of reflector 120 is displaced from the focus of ellipsoidal reflector 110 and is positioned in a portion of gap 53 which is relatively free of the arc. The light collected by spherical reflector 120 is reimaged through the more transparent portion of arc 92 onto ellipsoidal reflector 110 from which it is reflected as a part of light beam 188. Light uniformity at the raster plane is again achieved by projecting light beam 188 through lens plates 70 and 71.

Although the invention has been described with particular reference to embodiments useful as light valve projection systems, it is to be understood that the light collection systems of the present invention are also useful in different types of projection systems. For example, motion picture projectors and film strip projectors could profitably employ the light collection systems of the invention. In such systems, which do not employ schlieren optics, input mask 72 and output mask 31 may be omitted. The motion picture film or film strip is located at the position of the image forming or raster plane of FIG. 1.

While the invention has been described with reference to specific embodiments, it will be appreciated that many additional modifications may be made by those skilled in the art, and it is intended that the appended claims cover all such modifications and changes as fall within the true spirit and scope of the invention.

What we claim as new and desire to secure by Letters Patent of the United States is:

1. In a short focal length light projection system of the light valve and film gate type for projecting light from an arc lamp through lenticular lens means to project a uniformly distributed image on the image forming plane of said light projection system, a compound reflector for said arc lamp comprising:

an ellipsoidal reflector formed of an uninterrupted full surface of revolution about a central axis and positioned to collect a portion of the light from said arc and reflect a direct image of light from said arc in a beam between an inner cone and an outer cone, and a spherical reflector formed of an uninterrupted full surface of revolution about said central axis and positioned to collect another portion of the light from said arc and reflect the light back to said ellipsoidal reflector to be reflected by said ellipsoidal reflector as a secondary image of light from said arc in said beam, said light beam being directed through said lenticular lens means to project said direct image and said secondary image onto said image forming plane, said arc lamp having an anode electrode and a cathode electrode positioned in line along said central axis and including means for establishing said arc in the gap between said electrodes, said arc having its hottest portion adjacent said cathode electrode and a less intense more transparent portion of said arc adjacent said anode electrode, said ellipsoidal reflector being positioned relative to said arc lamp such that the adjacent focus of said ellipsoidal reflector is substantially located in the hottest portion of said arc on said central axis adjacent said cathode electrode and said spherical reflector being positioned relative to said arc lamp such that the center of said spherical reflector is substantially located on said central axis in the lens intense region of said arc, whereby light reflected to said ellipsoidal reflector passes through said gap in the more transparent region of said arc.

2. A compound reflector as recited in claim 1, wherein the cathode electrode of said arc lamp is positioned forward of said anode electrode, said ellipsoidal reflector is positioned behind said arc to reflect light radiated to the rear by said arc lamp and said spherical reflector is positioned forward of said arc to reflect light radiated to the front by said arc lamp, said spherical reflector having an opening about said central axis at least as large as said outer cone to permit said beam to pass therethrough.

3. A compound reflector as recited in claim 2, wherein said spherical reflector is mounted to said ellipsoidal reflector offset from the latus rectum of said ellipsoidal reflector so that the center of said spherical reflector is behind the adjacent focus of said ellipsoidal reflector.

4. A compound reflector as recited in claim 1, wherein said spherical reflector is located inside said inner cone.

5. A compound reflector as recited in claim 1, wherein said ellipsoidal reflector is positioned forward of said arc and said spherical reflector is positioned behind said arc.

* * * * *